(12) United States Patent
Berger et al.

(10) Patent No.: US 11,737,431 B2
(45) Date of Patent: Aug. 29, 2023

(54) BIRD FEEDER SUPPORT SYSTEM

(71) Applicants: Denise Michelle Berger, Lublin, WI (US); John A. Crockett, Milwaukee, WI (US); Nelson Flores, Milwaukee, WI (US); Steve Paul Berger, Lublin, WI (US)

(72) Inventors: Denise Michelle Berger, Lublin, WI (US); John A. Crockett, Milwaukee, WI (US); Nelson Flores, Milwaukee, WI (US); Steve Paul Berger, Lublin, WI (US)

( * ) Notice: Subject to any disclaimer, the term of this patent is extended or adjusted under 35 U.S.C. 154(b) by 275 days.

(21) Appl. No.: 17/303,307

(22) Filed: May 26, 2021

(65) Prior Publication Data
US 2021/0368743 A1 Dec. 2, 2021

Related U.S. Application Data

(60) Provisional application No. 63/032,198, filed on May 29, 2020.

(51) Int. Cl.
*A01K 39/014* (2006.01)
(52) U.S. Cl.
CPC .................................. *A01K 39/014* (2013.01)
(58) Field of Classification Search
CPC .................................................... A01K 39/014
See application file for complete search history.

(56) References Cited

U.S. PATENT DOCUMENTS

| | | | | |
|---|---|---|---|---|
| 3,667,618 A * | 6/1972 | Bertoia | ............... | B65G 1/0442 212/319 |
| 4,767,088 A * | 8/1988 | Fielder | ............... | A01K 39/0113 248/121 |
| 5,566,784 A * | 10/1996 | Rennetaud | ............... | B66B 9/02 187/257 |
| 5,766,002 A * | 6/1998 | Silvestrini | ............... | A23L 3/04 414/196 |
| 5,775,866 A * | 7/1998 | Tax | ............... | B66C 19/002 414/141.4 |
| 5,807,059 A * | 9/1998 | Takeda | ............... | E04G 21/04 414/141.8 |
| 6,269,771 B1 * | 8/2001 | Cotter | ............... | A01K 39/0113 119/57.9 |
| 6,354,244 B1 * | 3/2002 | Green | ............... | A01K 39/014 119/429 |
| 6,386,142 B1 * | 5/2002 | Holscher | ............... | A01K 31/12 119/51.01 |
| D476,117 S * | 6/2003 | Nicholas | ............... | D30/124 |
| D575,462 S * | 8/2008 | Cienfuegos | ............... | D30/124 |
| 11,172,653 B1 * | 11/2021 | Reed | ............... | A01K 39/0113 |
| 11,623,845 B2 * | 4/2023 | Studer | ............... | B66B 11/0095 187/249 |
| 2003/0019436 A1 * | 1/2003 | Nicholas | ............... | A01K 39/014 119/57.92 |

(Continued)

*Primary Examiner* — Jessica B Wong
(74) *Attorney, Agent, or Firm* — von Briesen & Roper, s.c.

(57) ABSTRACT

A bird feeder support pole that is configured to selectively elevate and lower a crossbeam assembly supporting one or more bird feeders. The support pole eliminates the need to climb ladders or other objects to replenish the feeder with a bird feed. The crossbeam assembly is mounted with a trolley assembly that is movable along a length of the support pole via an elevating mechanism.

12 Claims, 5 Drawing Sheets

(56) References Cited

U.S. PATENT DOCUMENTS

| | | | |
|---|---|---|---|
| 2012/0328442 A1* | 12/2012 | Davis | F03D 1/0675 29/889 |
| 2014/0133939 A1* | 5/2014 | Richardson | E21B 19/155 414/22.55 |
| 2015/0275579 A1* | 10/2015 | Reyes | E06C 7/16 182/103 |
| 2017/0089088 A1* | 3/2017 | Lee | E04H 6/22 |
| 2020/0187427 A1* | 6/2020 | Brault | A01G 31/042 |
| 2021/0368743 A1* | 12/2021 | Berger | A01K 39/014 |
| 2022/0185630 A1* | 6/2022 | Weber | B66B 19/00 |
| 2023/0009666 A1* | 1/2023 | Pedretti | F03G 3/094 |

* cited by examiner

BIRD FEEDER SUPPORT SYSTEM

CROSS-REFERENCE TO RELATED APPLICATION

This application claims the benefit of priority of U.S. provisional application No. 63/032,198 filed May 29, 2020, the contents of which are herein incorporated by reference.

BACKGROUND OF THE INVENTION

The present invention relates to bird feeders, and more particularly to bird feeders positioned in an elevated position above a support surface.

Filling bird feeders located on an elevated pole can be dangerous while utilizing a ladder or other objects to reach the height of the feeder for refilling. For old and young alike, climbing to retrieve, fill, and rehang the feeder(s) can pose a falling hazard.

Utilizing other feeder poles, filling them located on an elevated pole can be dangerous while utilizing a ladder or other object.

As can be seen, there is a need for improved apparatus and methods for safely refilling a bird feeder.

SUMMARY OF THE INVENTION

In one aspect of the present invention, a bird feeder support system is disclosed. The bird feeder support system includes an elevation pole segment having a top end and a bottom end. A trolley assembly has a plurality of rollers disposed about an outer surface of the elevation pole segment. The plurality of rollers are configured for traversal of the trolley assembly along the elevation pole segment. A crossbeam assembly is coupled to the trolley assembly. The crossbeam assembly has a plurality of mounting points disposed in a spaced apart relation along a longitudinal length of the crossbeam assembly. The plurality of mounting points are adapted to attach a bird feeder to the crossbeam assembly. A carrier extends between the top end and the bottom end of the elevation pole segment. At least a first end of the carrier is attached with the trolley assembly. A drive mechanism has an electric motor that is operable to selectively drive a second end of the carrier to move the trolley assembly between an elevated position and a lowered position.

In some embodiments, an upper pulley is mounted proximal to the top end of the elevation pole segment and the carrier is entrained about the upper pulley.

In some embodiments, the trolley assembly includes a first pair of horizontally disposed trolley rollers that are configured for rolling engagement with first opposite sides of the elevation pole segment. A second pair of laterally disposed trolley rollers are configured for rolling engagement with second opposite sides of the elevation pole segment.

In some embodiments, a control box is mounted to a lower end of the elevation pole segment, wherein the electric motor and drive mechanism are contained within the control box.

In some embodiments, an upper stop sensor mounted proximal to the top end of the elevation pole segment. The upper stop sensor is configured to interrupt operation of the electric motor to stop the trolley assembly at the elevated position. A lower stop sensor is mounted above the control box along the elevation pole segment, the lower stop sensor configured to detect the lowered position of the trolley assembly and interrupt operation of the electric motor to stop the trolley assembly at the lowered position.

In some embodiments, at least a portion of the carrier is routed internally of the elevation pole segment.

In some embodiments, each of the first end and the second end of the carrier are attached to the trolley assembly.

In other embodiments, a tensioner that is selectively adjustable to reduce a slack condition in the carrier.

In other embodiments, the bird feeder support system includes a ground pole segment. A bracket couples the ground pole segment with the elevation pole segment.

In other aspects of the invention a bird feeder support system is disclosed. The bird feeder support system includes an elevation pole segment having a top end and a bottom end. A trolley assembly has a plurality of rollers disposed for rolling engagement with an outer surface of the elevation pole segment. A carrier extends between the top end and the bottom end of the elevation pole segment. At least a first end of the carrier is attached with the trolley assembly. Aa drive mechanism is mounted in a fixed position to the elevation pole segment. The drive mechanism is operable to selectively drive a second end of the carrier to move the trolley assembly between a lowered position and an elevated position.

In some embodiments, a crossbeam assembly is coupled to the trolley assembly. The crossbeam assembly has a plurality of mounting points disposed in a spaced apart relation along a longitudinal length of the crossbeam assembly. The plurality of mounting points are adapted to attach a bird feeder to the crossbeam assembly.

In some embodiments, an electric motor to selectively operates the drive mechanism in one of a first direction and a second direction.

In other embodiments, a pulley disposed at a top end of the elevation pole segment, wherein the carrier is disposed in a loop entrained about the pulley and a drive pulley operated by the electric motor.

These and other features, aspects and advantages of the present invention will become better understood with reference to the following drawings, description and claims.

DETAILED DESCRIPTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide a support pole for a bird feeder that selectively elevates and lowers a cross beam that configured to support one or more bird feeders so that the one or more bird feeders may be replenished with a bird feed. Preferably, support pole includes an elevation mechanism that is operated by an electric motor, such as a worm gear motor.

Figure 1:
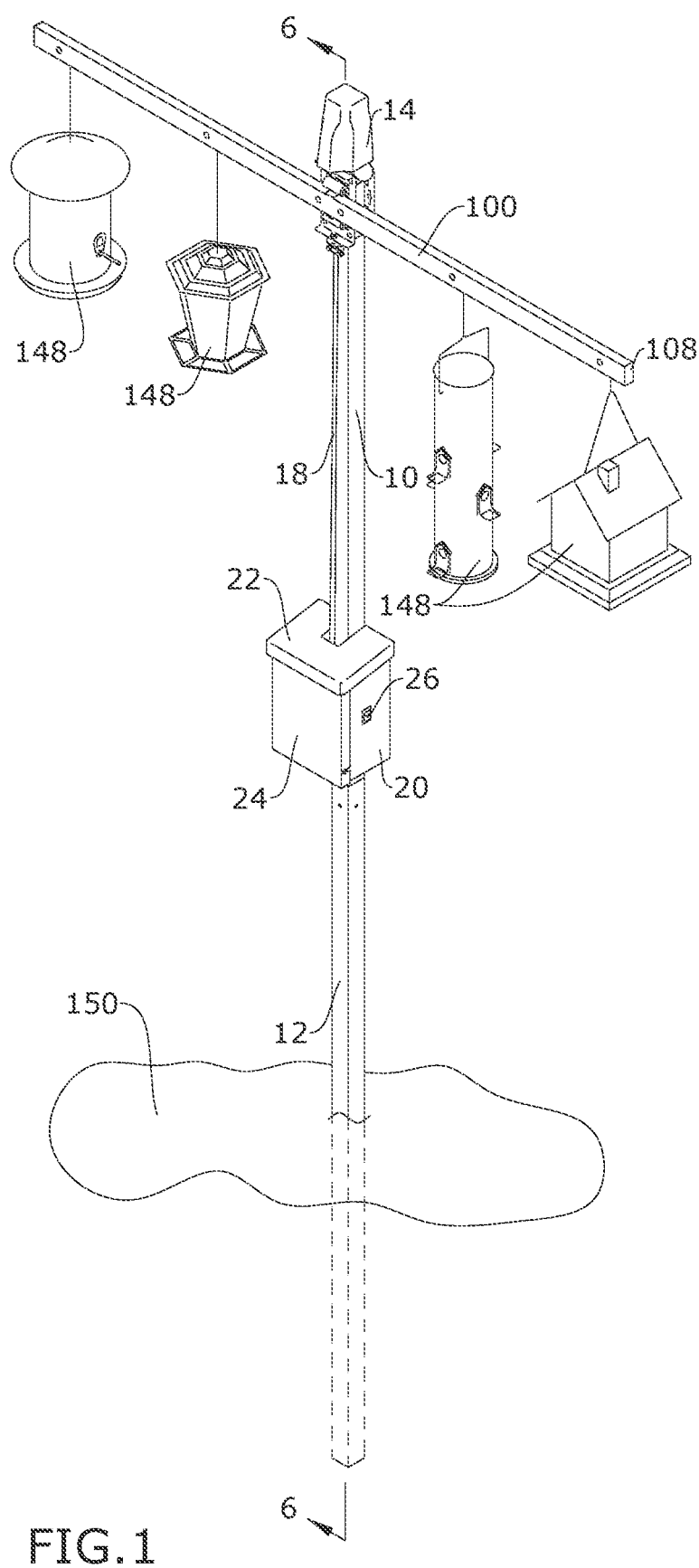
FIG. 1 is a perspective view of a bird feeder support system.
Figure 2:
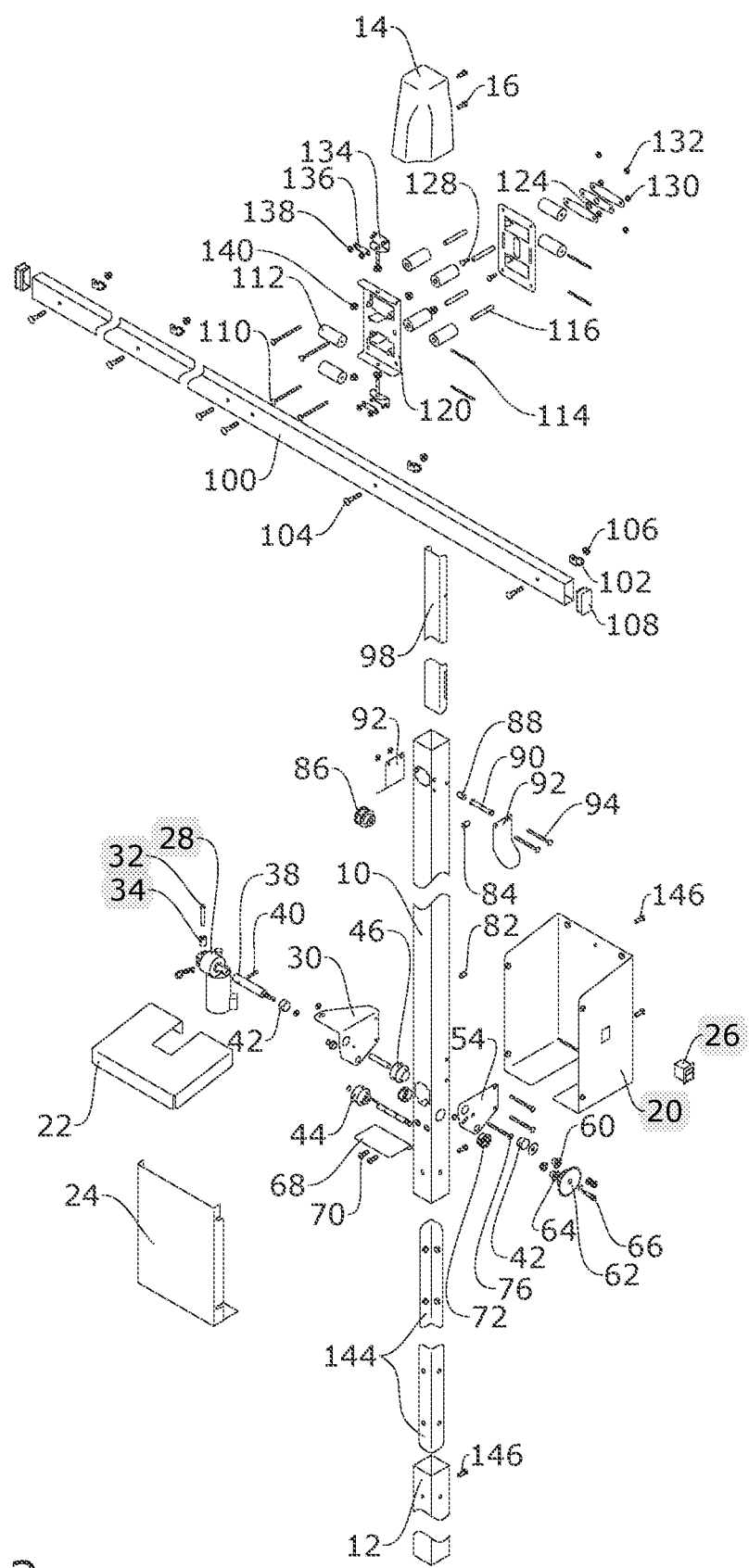
FIG. 2 is an exploded perspective view of the bird feeder support system.
Figure 3:
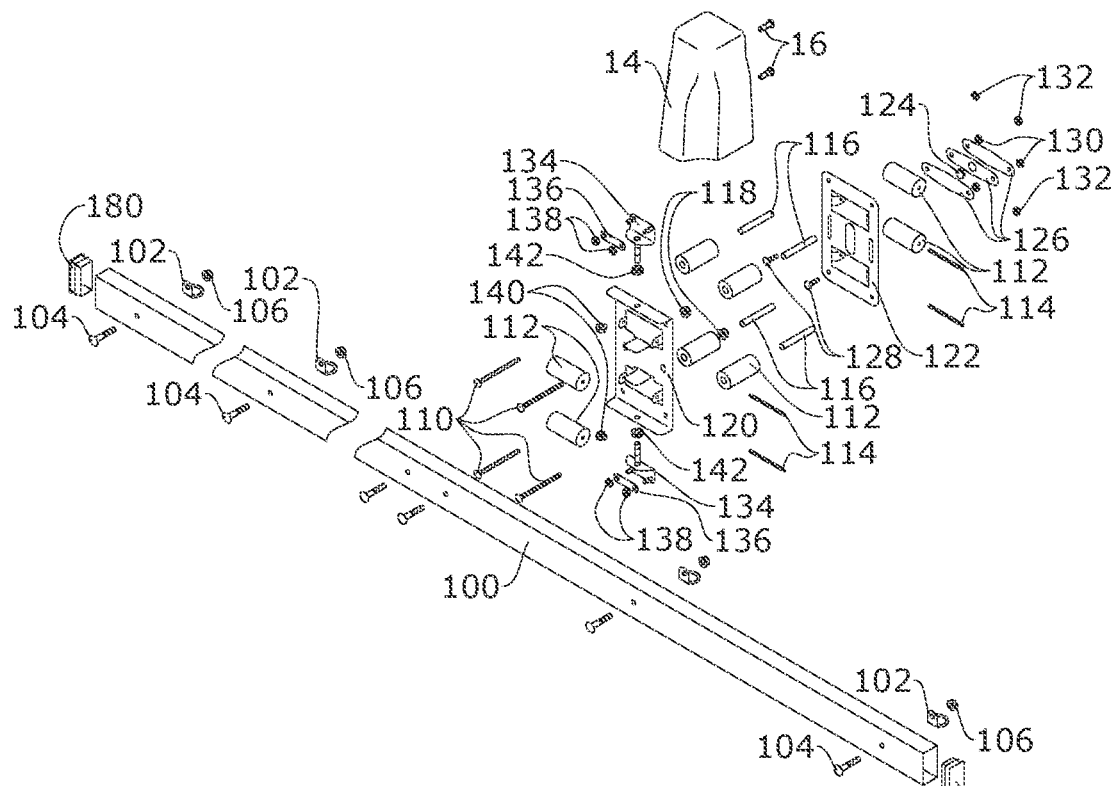
FIG. 3 is an exploded view of the bird feeder support system crossbeam assembly.
Figure 4:
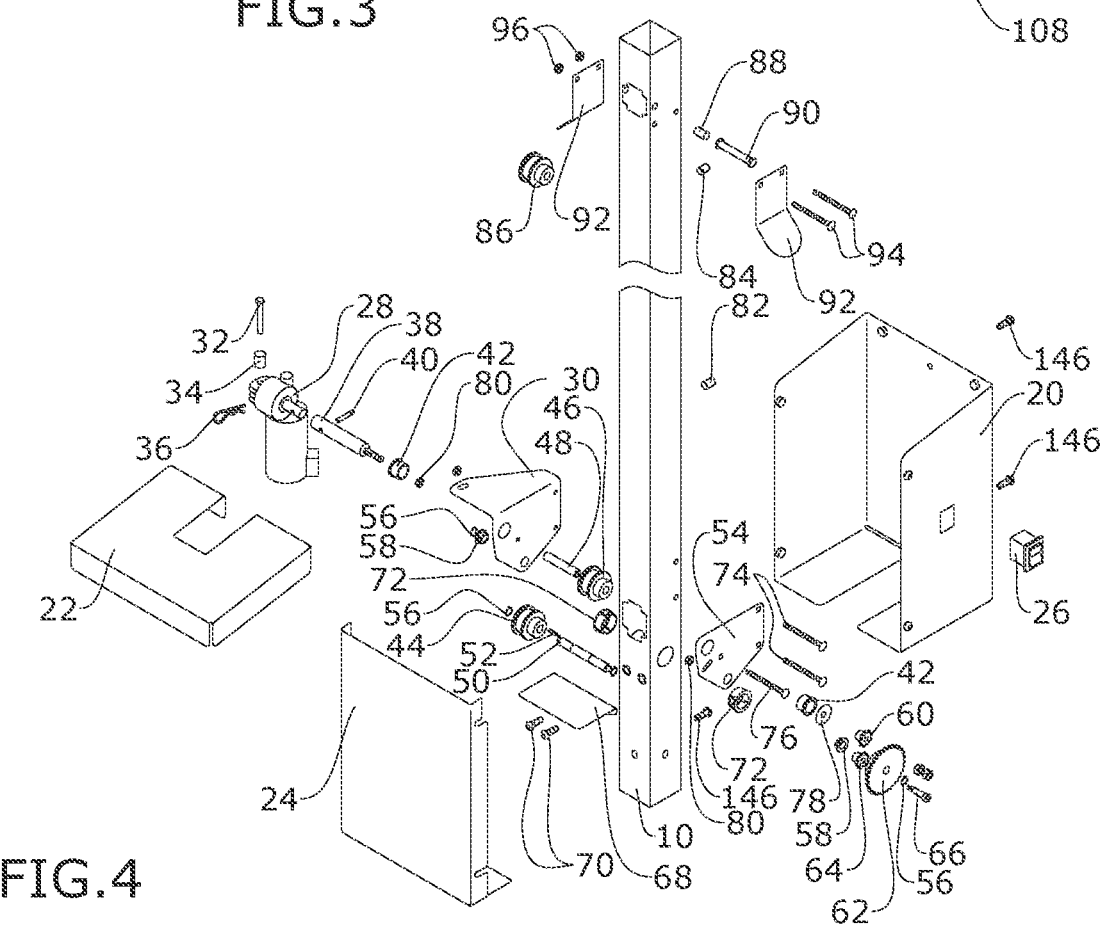
FIG. 4 is a detailed exploded view of the elevation mechanism.
Figure 5:
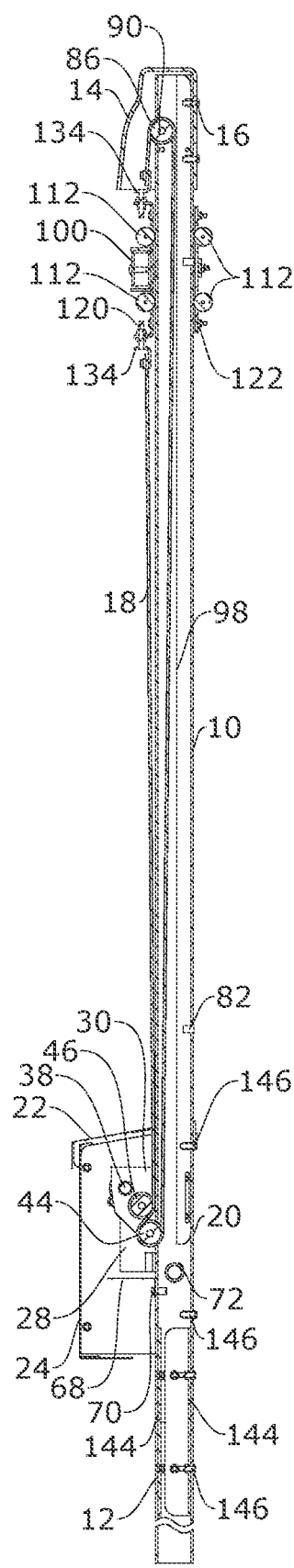
FIG. 5 is a side cross sectional view taken along line 6-6 of FIG. 1, showing the electric bird feeder pole with the crossbeam assembly in an elevated position.
Figure 6:
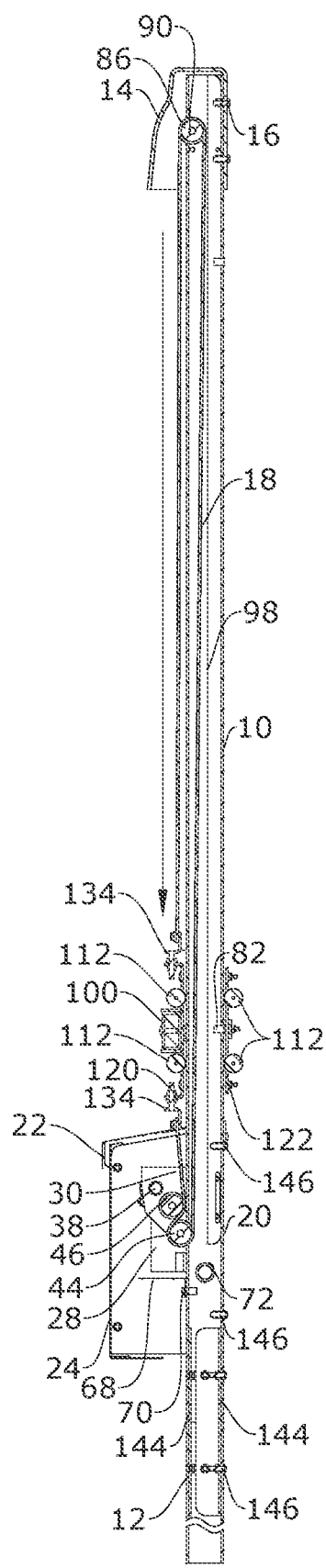
FIG. 6 is a side cross sectional view taken along line 6-6 of FIG. 1, showing the bird feeder support system with the crossbeam assembly in a lowered position.
Figure 7:
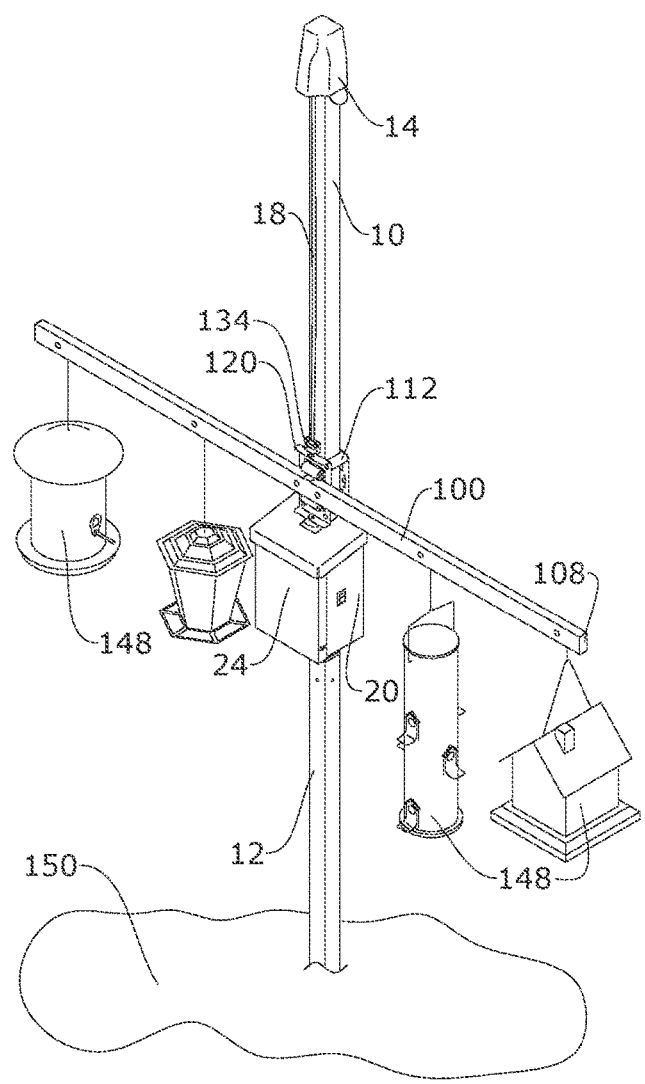
FIG. 7 is a front perspective view of the bird feeder support system in a lowered position.
Figure 8:
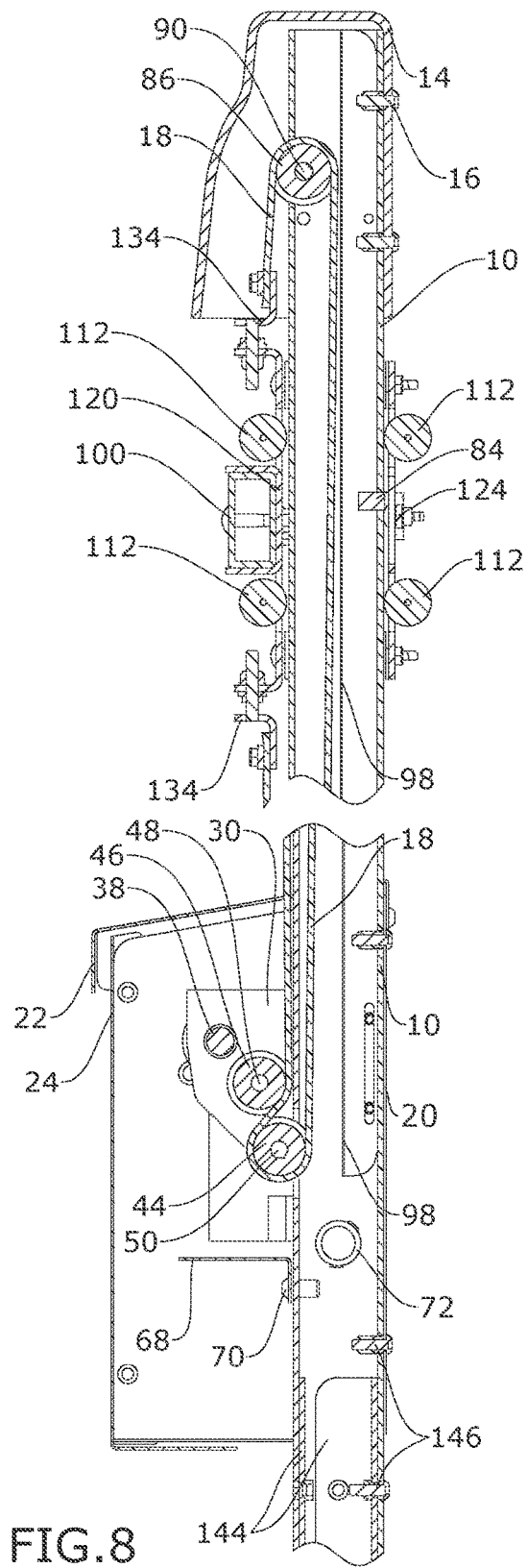
FIG. 8 is a detail cross sectional view of the invention showing the elevation mechanism.

As seen in reference to the drawings of FIGS. 1-8, the support pole includes an elevation pole segment 10 and a ground pole element 12. The elevation pole segment 10 carries a cross beam assembly 100 that is selectively elevated and lowered by an elevation mechanism. Preferably, the elevation pole segment 10 is formed as a rectangular tube. In the lowered position, one or more bird feeders 148, suspended by the crossbeam assembly 100 can be safely replenished with a bird feed. In the elevated position, the one or more bird feeders 148 are positioned at raised position relative to the ground surface 150 so that the birds may feed without being threatened by ground predators. The bird feeders 148 are also positioned so that the bird feed accessible by squirrels and other varmints.

The ground pole segment 12 has a lower length that is buried within a ground surface 150. Alternatively, the ground pole segment 12 may be attached to a supporting structure. The elevation pole segment 10 is coupled with the ground pole segment 12 in an upright orientation. In the non-limiting embodiment shown, a coupling bracket 144 secures a top end of the ground pole segment 12 and the elevation pole segment 10 via a plurality of mounting bolts.

The elevation pole segment 10 carries an elevation mechanism. A protective cap 14 is disposed at a top end of the elevation pole segment 10 to protect the interior of the elevation pole segment and elevation mechanism from environmental contaminants. The protective cap 14 is secured by one or more fasteners 16.

A control box 20 is positioned proximal to the ground surface 150 at a height that is readily accessible by the user, typically about shoulder height. The control box may include a lid 22, a front surface 24 and a control switch 26 secured via a mounting bolt 146 to the elevation pole segment 10. The control switch 26 may be a double pole double throw (DPDT) switch, wherein operation in a first position activates a motor 28 to elevate the crossbeam assembly 100 and operation in a second position activates the motor 28 to lower the crossbeam assembly.

A motor 28 is carried within the control box 20 and may be secured within the control box 20 via a motor bracket 30. A pin 32 and a spacer 34, secured with a cotter pin 36 prevent rotation of the motor 28 when mounted. A motor shaft 38 may be coupled to the motor 28 via a roll pin 40. A bushing 42 is mounted in the motor bracket 30 to support rotation of the motor shaft 38, when mounted. A distal end of the motor shaft 38 is attached to a plurality of sprockets, 60, 62, 64, 66, are mounted to a gear box bracket 54. Fasteners 74 and nuts 80 may secure the motor bracket 30 and the gear box bracket 54 to the elevation pole segment. The motor 28 may be operated by an electrical source, such as a battery. As will be appreciated, a mechanical hand crank may also be employed.

An output of the plurality of sprockets is connected to a drive shaft 50 having a drift key 52 to couple the drive shaft 50 to the drive pulley 44. The drive pulley 44 is configured to drive a carrier 18, such as a belt, a chain, a band, or a cable to raise and lower the crossbeam assembly 100. A tensioner pulley 46, rotationally carried on a tensioner shaft 40 secured by a snap ring 56 at a proximal end and a washer 78 and bolt 76, may be provided to apply a tension to the carrier 18.

A lower stop sensor 82 detects the position of the carrier assembly as it reaches a lower traversal limit to stop the drive motor 28. An upper stop sensor 84 is positioned at a top end of the elevation pole segment 10 to detect an upper traversal limit to stop the drive motor 28 when the carrier assembly has reached the top of the elevation pole segment 10. The lower stop sensor 82 and upper stop sensor 84, may for example, be a magnetically activated reed switch.

An upper pulley 86 is rotationally carried on an upper pulley shaft 90 via a bushing 88. The upper pulley 86 supports the carrier 18 at an upper end of the elevation pole segment 10. The upper pulley shaft 90 may be mounted to the elevation pole segment 10 via bolstering flanges 92, secured with bolts 92 and nuts 96. A carrier guide 98 may be contained within an interior space of the elevation pole segment 10 between the upper end and the lower ends thereof.

The crossbeam assembly 100 includes a plurality of feeder mounts 102, which are attached in a spaced apart relation along a longitudinal length of the cross bar via a bolt 104 and a nut 106. Opposed ends of the cross beam may include endcaps 108 fitted thereto. The crossbeam assembly 100 is moveably coupled to the elevation poole segment 10 via a trolley assembly. The trolley assembly include a trolley bracket 120, 122 support a plurality of trolley rollers 112 that carry the crossbeam assembly 100 along the elevation pole segment 10. The trolley rollers 112 are rotationally carried on a shaft 116 supported between the trolley brackets 120, 122, via a bolt 110 and a nut 132. A plurality of bolts 110 and nuts 118 are utilized to affix the trolley assembly about the elevation pole segment 10.

The plurality of trolley rollers 112 preferably include a pair of opposed horizontally disposed trolley rollers 112 and a pair of opposed laterally disposed trolley rollers 112. The pair of horizontally disposed trolley rollers 112 are configured to roll along opposite first side edges of the elevation pole segment 10 while the pair of laterally disposed trolley rollers 112 are configured to roll along opposite second side edges of the elevation pole segment 10. In this configuration, the trolley assembly is able to traverse the elevation pole segment 10 between the elevated and the lowered positions. The configuration of the trolley assembly also prevents twisting of the crossbeam 10 about a vertical axis of the elevation pole segment 10 and maintains orientation of the crossbeam 10 in a generally horizontal direction.

A magnet 124 is mounted to the trolley assembly via a magnet holding bracket 126 secured with a fastener, such as a bolt 128 and a nut 130. The magnet 124 may be a neodymium magnet that is positioned to activate the lower stop sensor 82 reed switch as the trolley assembly reaches a lower traversal limit to stop the drive motor 28 and the upper stop sensor 84 reed switch as the trolley assembly reaches the elevated position.

A first end of the carrier 18 is attached to a belt clamp 136 that may be attached to the trolley brackets 120, 122 via a fastener such as a nut 149 and a bolt. A second end of the carrier 18 is attached to a tensioner bracket 134, via a fastener such as a nut 136 and a bolt 132. A tensioner nut 142 provides for adjustment of the tension of the carrier 18 when installed within the elevation pole segment 10 to eliminate excessive slack in the carrier 18 to prevent derailment from the upper pulley 86 and the drive pulley 44.

A mounting plate 68 may be provided for including control electronics and secured within the housing by a fastener 70 and a pass-through grommet 72 carries through electronics connections to an interior of the elevation pole segment 10.

To replenish a supply of bird feed to the one or more bird feeders 148, the elevation mechanism may be operated to lower the cross beam 100 to a level proximal to a ground surface 150 where the user may fill the one or more bird feeders 148 with bird feed. If desired, the one or more bird feeders 148 may be removed from their corresponding feeder mount 102. Once replenished, the one or more bird feeders 148 are attached to their corresponding feeder mount 102. The elevation mechanism may then be operated to elevate the cross beam 100 to the elevated position above the ground surface 150.

In some embodiments, activation of an elevation control switch 26 selectively operates the drive motor 26 which through the gear box will operate the drive pulley 44. The drive pulley 44 moves the carrier 18, entrained about the drive pulley 48 to move the trolley assembly along the elevation pole segment 10 to lower the crossbeam assembly 100. Upon the trolley assembly reaching the lower stop sensor 82, power to the drive motor 26 is interrupted and movement of the crossbeam assembly 100 stops. Upon replenishment of the one or more bird feeders 148 with a bird feed, the elevation control switch 26 may be activated to elevate the crossbeam assembly 100 to a desired elevation. Upon reaching the upper stop sensor 84, power to the motor 26 is interrupted and movement of the trolley assembly stops to retain the crossbeam assembly 100 at the fully elevated position.

It should be understood, of course, that the foregoing relates to exemplary embodiments of the invention and that modifications may be made without departing from the spirit and scope of the invention as set forth in the following claims.

What is claimed is:

1. A bird feeder support system, comprising: an elevation pole segment having a top end and a bottom end; a trolley assembly having a plurality of rollers disposed about an outer surface of the elevation pole segment, the plurality of rollers configured for traversal of the trolley assembly along the elevation pole segment; a crossbeam assembly coupled to the trolley assembly, the crossbeam assembly having a plurality of mounting points disposed in a spaced apart relation along a longitudinal length of the crossbeam assembly, the plurality of mounting points configured to attach a bird feeder to the crossbeam assembly, a carrier extending between the top end and the bottom end of the elevation pole segment, at least a first end of the carrier is attached with the trolley assembly; and a drive mechanism having an electric motor configured to selectively drive a second end of the carrier to move the trolley assembly between an elevated position and a lowered position.

2. The bird feeder support system of claim 1, further comprising:
an upper pulley mounted proximal to the top end of the elevation pole segment, wherein the carrier is entrained about the upper pulley.

3. The bird feeder support system of claim 2, wherein the trolley assembly further comprises:
a first pair of horizontally disposed trolley rollers are configured for rolling engagement with first opposite sides of the elevation pole segment; and
a second pair of laterally disposed trolley rollers are configured for rolling engagement with second opposite sides of the elevation pole segment.

4. The bird feeder support system of claim 3, further comprising:
a control box mounted to a lower end of the elevation pole segment, wherein the electric motor and drive mechanism are contained within the control box.

5. The bird feeder support system of claim 4, further comprising:
an upper stop sensor mounted proximal to the top end of the elevation pole segment, the upper stop sensor configured to interrupt operation of the electric motor to stop the trolley assembly at the elevated position; and
a lower stop sensor mounted above the control box along the elevation pole segment, the lower stop sensor configured to detect the lowered position of the trolley assembly and interrupt operation of the electric motor to stop the trolley assembly at the lowered position.

6. The bird feeder support system of claim 5, wherein at least a portion of the carrier is routed internally of the elevation pole segment.

7. The bird feeder support system of claim 6, wherein each of the first end and the second end of the carrier are attached to the trolley assembly.

8. The bird feeder support system of claim 7, further comprising:
a tensioner that is selectively adjustable to reduce a slack condition in the carrier.

9. The bird feeder support system of claim 8, further comprising:
a ground pole segment: and
a bracket to couple the ground pole segment with the elevation pole segment.

10. A bird feeder support system, comprising: an elevation pole segment having a top end and a bottom end; a trolley assembly having a plurality of rollers disposed for rolling engagement with an outer surface of the elevation pole segment; a carrier extending between the top end and the bottom end of the elevation pole segment, at least a first end of the carrier is attached with the trolley assembly; and a drive mechanism mounted in a fixed position to the elevation pole segment, the drive mechanism configured to selectively drive a second end of the carrier to move the trolley assembly between a lowered position and an elevated position; a crossbeam assembly coupled to the trolley assembly, the crossbeam assembly having a plurality of mounting points disposed in a spaced apart relation along a longitudinal length of the crossbeam assembly, the plurality of mounting points configured to attach a bird feeder to the crossbeam assembly.

11. The bird feeder support system of claim 10, further comprising: an electric motor to selectively operate the drive mechanism in one of a first direction and a second direction.

12. The bird feeder support system of claim 11, further comprising:
a pulley disposed at a top end of the elevation pole segment, wherein the carrier is disposed in a loop entrained about the pulley and a drive pulley operated by the electric motor.

* * * * *